(12) United States Patent
Mizuno et al.

(10) Patent No.: US 7,527,875 B2
(45) Date of Patent: May 5, 2009

(54) GROUP OF METAL MAGNETIC NANOPARTICLES AND METHOD FOR PRODUCING THE SAME

(75) Inventors: Mikihisa Mizuno, Miyagi (JP); Yuichi Sasaki, Miyagi (JP); Makoto Inoue, Miyagi (JP)

(73) Assignee: Sony Corporation, Tokyo (JP)

( * ) Notice: Subject to any disclaimer, the term of this patent is extended or adjusted under 35 U.S.C. 154(b) by 328 days.

(21) Appl. No.: 11/137,735

(22) Filed: May 25, 2005

(65) Prior Publication Data
US 2006/0068217 A1    Mar. 30, 2006

(30) Foreign Application Priority Data
May 26, 2004 (JP) ............................ P2004-155651

(51) Int. Cl.
*B32B 15/02* (2006.01)

(52) U.S. Cl. .................... 428/570; 252/62.55; 427/216; 427/217; 427/132

(58) Field of Classification Search ....................... None
See application file for complete search history.

(56) References Cited

U.S. PATENT DOCUMENTS

| | | | |
|---|---|---|---|
| 6,262,129 B1 * | 7/2001 | Murray et al. ................. 516/33 |
| 6,815,063 B1 * | 11/2004 | Mayes ........................ 428/402 |
| 7,029,514 B1 * | 4/2006 | Yang et al. .................... 75/348 |
| 7,147,687 B2 * | 12/2006 | Mirkin et al. ................. 75/343 |
| 2002/0068187 A1 * | 6/2002 | O'Connor et al. ........... 428/546 |
| 2003/0039860 A1 * | 2/2003 | Cheon et al. ............. 428/694 T |
| 2004/0038255 A1 * | 2/2004 | Mirkin et al. ................... 435/6 |
| 2004/0219361 A1 * | 11/2004 | Cui et al. ................. 428/402.2 |
| 2004/0247924 A1 * | 12/2004 | Andres et al. ............... 428/546 |
| 2006/0177660 A1 * | 8/2006 | Kumar et al. ............... 428/403 |
| 2006/0233712 A1 * | 10/2006 | Penades et al. ............ 424/9.34 |

FOREIGN PATENT DOCUMENTS

| | | |
|---|---|---|
| JP | 2000-054012 | 2/2000 |
| JP | 2003-515921 | 5/2003 |

OTHER PUBLICATIONS

Translation of JP 2000-054012.*
Farrell et al., "Preparation and Characterization of Monodisperse Fe Nanoparticles" American Chemical Society, pp. 11022-11030, 2003.
Luna et al., "Effects of surfactants on the particle morphology and self-organization of Co nanocrystals," Materials Science and Engineering, pp. 1129-1132, 2003.
Puntes et al., "Colloidal Nanocrystal Shape and Size Control: The Case Cobalt," Science, vol. 291, pp. 2115-2117, Mar. 16, 2001.

(Continued)

*Primary Examiner*—John J Zimmerman
(74) *Attorney, Agent, or Firm*—K&L Gates LLP (57) ABSTRACT

A group of metal magnetic nanoparticles is provided. The metal magnetic nanoparticle includes a core having a noble metal cluster of a diameter of 3 nm or less; and a metal shell, formed to surround the core, having noble metal atoms randomly distributed therein; wherein the metal shell has a noble metal atom content: (number of noble metal atoms)/(number of whole metal atoms)×100 of 1 to 15 at. %.

2 Claims, 4 Drawing Sheets

OTHER PUBLICATIONS

Park et al., "Synthesis and Magnetic Studies of Uniform Iron Nanorods and Nanospheres," American Chemical Society, pp. 8581-8582, 2000.

Sun et al., "Synthesis of monodisperse cobalt nanocrystals and their assembly into magnetic superlattices (invited)," Journal of Applied Physics, vol. 85, pp. 4325-4330, 1999.

Toneguzzo et al., "Heterogeneous Nucleation and Growth of Metal Nanoparticles in Polyols," Scripta Mater, vol. 44, pp. 2263-2267, 2001.

Advanced Materials. vol. 10, No. 13. 1998. (971-1035).

Viau, G., Fievet-Vincent, F., and Fievet, F., "Monodispersed Iron-Based Particles: Precipitation in Liquid Polyols", J. Mater. Chem, 6(6):1047-1053, (1996).

Viau, G., Fievet-Vincent, F., and Fievet, F., "Nucleation and Growth of Bimetallic CoNi and FeNi Monodispersed Particles Prepared in Polyols", Solid State Ionics, 84:259-270, (1996).

* cited by examiner

GROUP OF METAL MAGNETIC NANOPARTICLES AND METHOD FOR PRODUCING THE SAME

CROSS REFERENCE TO RELATED APPLICATION

The present application claims priority to Japanese Patent Application No. JP2004-155651 filed in the Japanese Patent Office on May 26, 2004, the entire contents of which being incorporated herein by reference.

BACKGROUND

The present invention relates to a group of metal magnetic nanoparticles and a method for producing the same. More particularly, the present invention is concerned with a group of metal magnetic nanoparticles having excellent oxidation resistance and excellent dispersibility and a method for producing the group of metal magnetic nanoparticles in high yield.

Magnetic nanoparticles have drawn attention as essential materials for achieving a variety of next-generation nanotechnology devices, such as high-density magnetic recording media, radio-frequency electromagnetic wave shields, new immunological test systems, and drug delivery systems. For the application of the magnetic nanoparticles to these devices, the development of a method for synthesizing a group of magnetic nanoparticles having controlled particle form, particle diameter, and particle size distribution is required. Particularly, the development of a method for synthesizing uniform nanoparticles of a magnetic material comprised of a metal or an alloy having a large magnetic moment is desired.

With respect to the method for synthesizing a group of magnetic nanoparticles, it is known that a liquid-phase synthesis method can control the particle form or particle size distribution, and liquid-phase synthesis methods for groups of nanoparticles comprised of Fe, Co, Ni, or an alloy thereof have been reported. See, Japanese Patent Application Publication No. 2000-54012; Japanese National Patent Application Publication of Translated Version (kohyo) No. 2003-515921; S. J. Park, S. Kim, S. Lee, Z. G. Khim, K. Char, and T. Hyeon, J. Am. Chem. Soc. 122, 8581 (2000); S. Sun and C. B. Murray, J. Appl. Phys. 85, 4325 (1999); and V. F. Puntes, K. M. Krishan, and A. P. Alivisatos, Science 291, 2115 (2001).

In addition, it has been reported that a particle growth method utilizing a noble metal atom cluster of Pt or Ag can produce particles having an extremely reduced particle diameter. See, G. Viau, P. Toneguzzo, A. Pierrard, O. Acher, F. Fievet-Vincent, and F. Fievet, Scripta mater. 44, 2263 (2001); D. Farrell, S. A. Majetich, and J. P. Wilcoxon, J. Phys. Chem. B 107, 11022 (2003); and C. Luna, M. P. Morales, C. J. Serna, and M. Vazquez, Materials Science and Engineering C 23, 1129 (2003).

However, the groups of metal magnetic nanoparticles obtained by the above synthesis methods have a problem in that the nanoparticles have poor chemical stability and hence are oxidized in air as a period of time lapses, so that their magnetic moment is gradually lowered. Therefore, when the group of nanoparticles which deteriorates with time is incorporated into a system, the resultant system has only limited reliability.

Further, the above synthesis methods have a problem in that part of or most of the group of nanoparticles suffers irreversible aggregation to cause settlings. The group of nanoparticles, which undergoes irreversible aggregation, is difficult to apply to various systems.

SUMMARY OF THE INVENTION

In view of the above problems, the present invention has been achieved, and provides in an embodiment a group of metal magnetic nanoparticles having excellent oxidation resistance and excellent dispersibility, and to provide in a further embodiment a method for producing the group of metal magnetic nanoparticles in high yield.

The present invention in an embodiment includes a group of metal magnetic nanoparticles with each metal magnetic nanoparticle including: a core having a noble metal cluster of a diameter of 3 nm or less; and a metal shell, formed to surround the core, having noble metal atoms randomly distributed therein, wherein the metal shell has a noble metal atom content: (number of noble metal atoms)/(number of whole metal atoms)×100 of 1 to 15 at. %.

It is preferred that the noble metal is selected from the group consisting of Pt, Rh, Au, Pd, Ru, Ag, Ir, Os, and combinations thereof.

It is preferred that the metal other than the noble metal is selected from the group consisting of a simple substance, a binary alloy, and a ternary alloy comprised of an element or elements selected from Fe, Co, and Ni.

In an embodiment, a method for producing a group of metal magnetic nanoparticles of the present invention is provided in that each metal magnetic nanoparticle includes: a core having a noble metal cluster of a diameter of 3 nm or less; and a metal shell, formed to surround the core, having noble metal atoms randomly distributed therein, wherein the metal shell has a noble metal atom content: (number of noble metal atoms)/(number of whole metal atoms)×100 of 1 to 15 at. %, wherein the method includes: mixing a reducing agent into an organic solution containing a noble metal precursor, a precursor of a metal other than the noble metal, and a dispersion stabilizer in an inert atmosphere; and heating the mixed solution prepared, wherein the ratio of the noble metal ions to the whole metal ions: (noble metal ions)/(whole metal ions)×100 in the mixed solution is 1 to 20%.

In another embodiment, a method for producing a group of metal magnetic nanoparticles of the present invention is provided in that each metal magnetic nanoparticle includes: a core having a noble metal cluster of a diameter of 3 nm or less; and a metal shell, formed to surround the core, having noble metal atoms randomly distributed therein, wherein the metal shell has a noble metal atom content: (number of noble metal atoms)/(number of whole metal atoms)×100 of 1 to 15 at. %, wherein the method comprises: mixing a reducing agent and a noble metal precursor into an organic solution containing a precursor of a metal other than the noble metal and a dispersion stabilizer in an inert atmosphere; and heating the mixed solution prepared, wherein the ratio of the noble metal ions to the whole metal ions: (noble metal ions)/(whole metal ions)×100 in the mixed solution is 1 to 20%.

In an embodiment the dispersion stabilizer is at least one organic compound represented by the formula: R—X wherein R represents a group selected from linear, branched, or cyclic hydrocarbon chains having 6 to 22 carbon atoms, and X represents a group selected from the group consisting of carboxylic acid, phosphonic acid, phosphinic acid, phosphine, sulfonic acid, sulfinic acid, and amine. The average particle diameter of the group of metal magnetic nanoparticles is advantageously controlled by appropriately selecting the dispersion stabilizer.

In an embodiment, it is preferred the heating is conducted at a temperature in the range of from 150° C. to 300° C.

In an embodiment, the average particle diameter of the group of metal magnetic nanoparticles is advantageously controlled by changing the ratio of the noble metal ions.

By the method of the present invention, a group of metal magnetic nanoparticles having a particle diameter of 20 nm or less and a particle diameter variance of 30% or less can be produced.

The group of metal magnetic nanoparticles of the present invention can provide a group of metal magnetic nanoparticles having excellent oxidation resistance and excellent dispersibility.

By the method of the present invention, the group of metal magnetic nanoparticles can be produced in high yield.

Additional features and advantages of the present invention are described in, and will be apparent from, the following Detailed Description of the Invention and the figures.

DETAILED DESCRIPTION

The construction of the group of metal magnetic nanoparticles according to an embodiment of the present invention will be described in greater detail.

Figure 1:
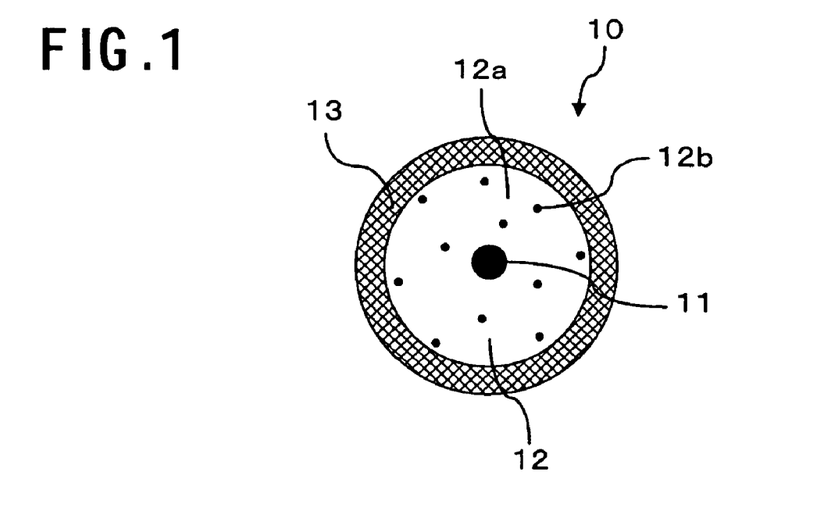
FIG. 1 is a cross-sectional view of a metal magnetic nanoparticle constituting the group of metal magnetic nanoparticles in an embodiment of the present invention.

FIG. 1 is a cross-sectional view of a metal magnetic nanoparticle constituting the group of metal magnetic nanoparticles of the present invention.

As shown in FIG. 1, a metal magnetic nanoparticle 10 includes a noble metal cluster core 11 having a noble metal atom cluster as a core, a metal shell 12, formed to surround the noble metal cluster core 11, having noble metal atoms 12$b$ randomly distributed therein, and a dispersion stabilizer layer 13 surrounding the metal shell 12.

The noble metal cluster core 11 includes a cluster of a noble metal atom selected from Pt, Rh, Au, Pd, Ru, Ag, Ir, Os, and combinations thereof. It is preferred that the noble metal cluster core 11 has a diameter of 3 nm or less.

The metal shell 12 includes the noble metal atoms 12$b$ randomly distributed in a non-noble metal matrix 12$a$ having a metal other than the noble metal.

The metal constituting the non-noble metal matrix 12$a$ is selected from the group consisting of a simple substance, a binary alloy, and a ternary alloy comprised of an element or elements selected from Fe, Co, and Ni.

Like the noble metal cluster core 11, the noble metal atoms 12$b$ are selected from Pt, Rh, Au, Pd, Ru, Ag, Ir, Os, and combinations thereof.

All the noble metal atoms present in the metal magnetic nanoparticle 10 contribute to the high yield in the production of the group of metal magnetic nanoparticles having excellent dispersibility. Among the noble metal atoms, the noble metal atoms 12$b$ randomly distributed in the metal shell 12 contribute to the oxidation resistance of the group of metal magnetic nanoparticles produced.

It is desired that the metal shell 12 has a noble metal atom 12$b$ content: (number of noble metal atoms)/(number of whole metal atoms)×100 in the range of from 1 to 15 at. %. In the present invention, the metal magnetic nanoparticle 10 having a higher noble metal atom 12$b$ content exhibits more excellent oxidation resistance, but it has a reduced magnetic moment. In other words, when the noble metal atom 12$b$ content is lower than 1 at. %, the group of metal magnetic nanoparticles does not exhibit a satisfactory oxidation resistance, and, when the content is higher than 15 at. %, the magnetic moment of the group of metal magnetic nanoparticles is disadvantageously too small.

The dispersion stabilizer layer 13 includes a dispersion stabilizer which has adsorbed onto the surface of the metal shell 12. It is preferred that the dispersion stabilizer is at least one organic compound represented by the formula: R—X, wherein R represents a group selected from linear, branched, or cyclic hydrocarbon chains having 6 to 22 carbon atoms, and X represents a group selected from the group consisting of carboxylic acid, phosphonic acid, phosphinic acid, phosphine, sulfonic acid, sulfinic acid, and amine.

The group of metal magnetic nanoparticles including the metal magnetic nanoparticle 10 preferably has an average particle diameter of 20 nm or less and a particle diameter variance (%) of 30% or less, more preferably a particle diameter variance (%) of 10% or less, further preferably 5% or less. The narrower the particle diameter variance (%), the higher the performance of a device having the group of particles incorporated.

The particle diameter variance (%) is a value determined by making a calculation using the following formula.

Particle diameter variance (%)=(Standard deviation)/(Average particle diameter)×100 (%)

The group of metal magnetic nanoparticles of the present invention can achieve excellent superparamagnetism and excellent oxidation resistance constantly for a long term without suffering aggregation.

Next, the method for producing a group of metal magnetic nanoparticles of the present invention is described.

The group of metal magnetic nanoparticles of the present invention is produced through a step for dissolving predetermined components (step 1), a heating step (step 2), and other steps (steps 3 to 5). The details of the process are described below.

In the step 1, in an inert atmosphere, a reducing agent is mixed into and dissolved in an organic solution which is preliminarily prepared by dissolving a noble metal precursor, a precursor of a metal other than the noble metal, and a dispersion stabilizer reducing agent in an organic solvent. Alternatively, a noble metal precursor and a reducing agent may be mixed into and dissolved in an organic solution which is preliminarily prepared by dissolving a precursor of a metal other than the noble metal and a dispersion stabilizer reducing agent in an organic solvent.

It is preferred that the noble metal precursor is at least one member selected from the group consisting of an aqua complex, an ammine complex, an acetylacetonato complex, a benzoylacetonato complex, an ethylenediamine complex, a phosphine complex, and a chloro complex of ion of a noble metal element selected from Pt, Rh, Au, Pd, Ru, Ag, Ir, and Os.

It is preferred that the precursor of a metal other than the noble metal is at least one member selected from the group consisting of an aqua complex, an ammine complex, an acetylacetonato complex, an ethylenediamine complex, an ethylenediaminetetraacetato complex, a chloro complex, an acetato complex, an oxalato complex, and a cyano complex of ion of a metal element selected from Fe, Co, and Ni.

By using a mixture of the above metal complexes as the precursor of a metal other than the noble metal, a group of alloy (e.g., FeCo, FeNi, or CoNi) magnetic nanoparticles can be synthesized. In this case, the composition of the alloy can be easily controlled by changing the molar ratio of the metal complexes, such as Fe (III) acetylacetonato complex, Fe (II) acetato complex, Fe (II) chloro complex, Co (II) acetylacetonato complex, Co(II) acetato complex tetrahydrate, Co(II) chloro complex, Ni (II) acetato complex tetrahydrate, Ni (II) chloro complex and the like.

It is desired that the noble metal ion ratio {(noble metal ions)/(whole metal ions)×100} in the mixed solution falls in the range of from 1 to 20%. The larger the noble metal ion ratio, the higher the yield of the group of metal magnetic nanoparticles having excellent dispersibility, but, when the noble metal ion ratio is higher than 20%, the content of the noble metal atoms in the metal shell 12 exceeds 15 at. %, so that the resultant metal magnetic nanoparticles disadvantageously have too small a magnetic moment. On the other hand, when the noble metal ion ratio is lower than 1%, the yield of the group of metal magnetic nanoparticles having excellent dispersibility is reduced, leading to poor efficiency. Furthermore, the content of the noble metal atoms in the metal shell 12 is smaller than 1 at. %, so that the resultant group of metal magnetic nanoparticles disadvantageously has an unsatisfactory oxidation resistance.

By changing the noble metal ion ratio, the average particle diameter of the group of metal magnetic nanoparticles to be formed can be controlled. The reason for this is that the amount of the noble metal cluster formed can be controlled by changing the noble metal ion ratio. The larger the noble metal ion ratio, the larger the amount of the noble metal cluster formed, or the more fine the group of nanoparticles formed.

It is preferred that the dispersion stabilizer is at least one organic compound represented by the formula: R—X wherein R represents a group selected from linear, branched, or cyclic hydrocarbon chains having 6 to 22 carbon atoms, and X represents a group selected from the group consisting of carboxylic acid, phosphonic acid, phosphinic acid, phosphine, sulfonic acid, sulfinic acid, and amine.

As the dispersion stabilizer, a polymer or dendrimer having at least one functional group selected from the group consisting of carboxylic acid, phosphonic acid, phosphinic acid, phosphine, sulfonic acid, sulfinic acid, and amine may be used.

By appropriately selecting the dispersion stabilizer, the average particle diameter of the group of metal magnetic nanoparticles to be formed can be controlled. The reason for this is that the reduction and deposition rates of the noble metal ions and metal ions other than the noble metal can be controlled by appropriately selecting the dispersion stabilizer.

It is preferred that the dispersion stabilizer is used in an amount 0.1 to 100 times the total molar amount of the noble metal ions and the metal ions other than the noble metal.

It is preferred that the reducing agent is selected from the group consisting of a monohydric alcohol, a dihydric alcohol, a trihydric alcohol, each having 8 to 22 carbon atoms, superhydride, and hydrazine.

It is preferred that the reducing agent is used in an amount 0.5 to 100 times the total molar amount of the noble metal ions and the metal ions other than the noble metal.

The organic solvent preferably has a boiling point of 150° C. or higher, and it is desirably an ether. Especially preferred is a high boiling-point solvent, such as diphenyl ether, dioctyl ether, or dibenzyl ether. As the atmosphere gas, an inert atmosphere of nitrogen gas or argon gas is used.

In the step 2, the mixed solution prepared in the step 1 above is heated to form a group of colloidal metal magnetic nanoparticles.

It is desired that the heating of the organic solution is conducted at a temperature in the range of from 150 to 300° C. When the heating temperature is lower than 150° C., the noble metal ions and metal ions other than the noble metal are unlikely to undergo reduction, making it difficult to form a group of metal magnetic nanoparticles. On the other hand, when the heating temperature is higher than 300° C., an unfavorable reaction, such as a change in properties of the dispersion stabilizer, is disadvantageously caused. The heating time may be about 10 minutes to 3 hours.

After the start of the heating for reaction, the reduction reaction of the noble metal ions and formation of the noble metal atom cluster core 11 first occur. The reason for this resides in that the redox potential of the noble metal ions is larger than that of the non-noble metal ions and therefore the noble metal ions are more easily reduced than the non-noble metal ions. The chemically active surface of the noble metal atom cluster core 11 formed serves as a catalyst to accelerate the reduction reaction of the non-noble metal ions, so that non-noble metal atoms deposit on the surface of the noble metal atom cluster core 11 (growth of the metal shell 12). Simultaneously, the unreacted noble metal ions are reduced to deposit. The reaction of the unreacted noble metal ions further accelerates the deposition of non-noble metal atoms. Finally, the dispersion stabilizer adsorbs onto the surface of the metal magnetic nanoparticles 10 to stop the growth of the metal magnetic nanoparticles 10. The step 2 is also conducted in an inert atmosphere of nitrogen or argon gas.

After the step 2, when it is observed that the group of metal magnetic nanoparticles suffers irreversible aggregation to cause settlings, the settlings are separated and removed by a filtration or decantation operation.

The smaller the noble metal ion ratio {(noble metal ions)/(whole metal ions)×100} in the mixed solution in the step 1, the larger the amount of the settlings formed. The reason for this is that, when the noble metal ion ratio is small, the reduction and deposition rate of the non-noble metal ions in the step 2 is low.

The addition of a flocculant permits the group of metal magnetic nanoparticles to deposit from the organic solution without causing the group of nanoparticles to suffer irreversible aggregation to separate the unreacted substances (unreacted noble metal precursor, metal precursor, dispersion stabilizer, and reducing agent) remaining in the solution. As the flocculant, ethanol or acetone, namely, a solvent which is miscible with the above organic solvent, and which has a solubility of the dispersion stabilizer different from the solubility of the dispersion stabilizer in the above organic solvent, may be used.

A hydrocarbon solvent is added to the purified group of metal magnetic nanoparticles to redisperse the nanoparticles. The hydrocarbon solvent may be selected from the group consisting of linear, branched, or cyclic hydrocarbon solvents having 6 to 22 carbon atoms, and examples include toluene.

Hereinbelow, examples are shown in which a group of metal magnetic nanoparticles is produced by the method for producing a group of metal magnetic nanoparticles of the present invention. The following Examples should not be construed as limiting the scope of the present invention.

Using Pt (II) acetylacetonato complex as the noble metal precursor, Co (II) acetato complex tetrahydrate as the precursor of a metal other than the noble metal, a combination of oleic acid and trioctylphosphine as the dispersion stabilizer, 1,2-hexadecanediol as the reducing agent, and phenyl ether as the organic solvent, a reaction was conducted in an argon gas atmosphere.

First, a phenyl ether solution containing 0.2 mmol of Pt (II) acetylacetonato complex, 4 mmol of Co (II) acetato complex tetrahydrate, 4 mmol of oleic acid, and 2 mmol of trioctylphosphine was heated to 240° C., and then a phenyl ether solution containing 8.4 mmol of 1,2-hexadecanediol was added to the heated solution. Phenyl ether was used in an amount of 50 ml. The Pt (II) ion ratio [{Pt (II) ions}/{Pt (II) ions+Co (II) ions}×100] was 4.8%.

Then, the phenyl ether solution prepared was reacted at a reaction temperature of 240° C. for 30 minutes to synthesize a group of Co magnetic nanoparticles. Subsequently, settlings were separated and removed, and then, using ethanol as a flocculant and toluene as a hydrocarbon solvent, the group of Co magnetic nanoparticles was purified and redispersed.

The yield was as high as 86%. The yield was determined from the following formula.

Yield=(Weight of the group of metal magnetic nano-
particles having excellent dispersibility)/(Weight
of the group of metal magnetic nanoparticles to
be formed from all the noble metal precursor and
the precursor of a metal other than the noble
metal)×100.

The remaining 14% portion included the settlings and unreacted substances.

Figure 2:
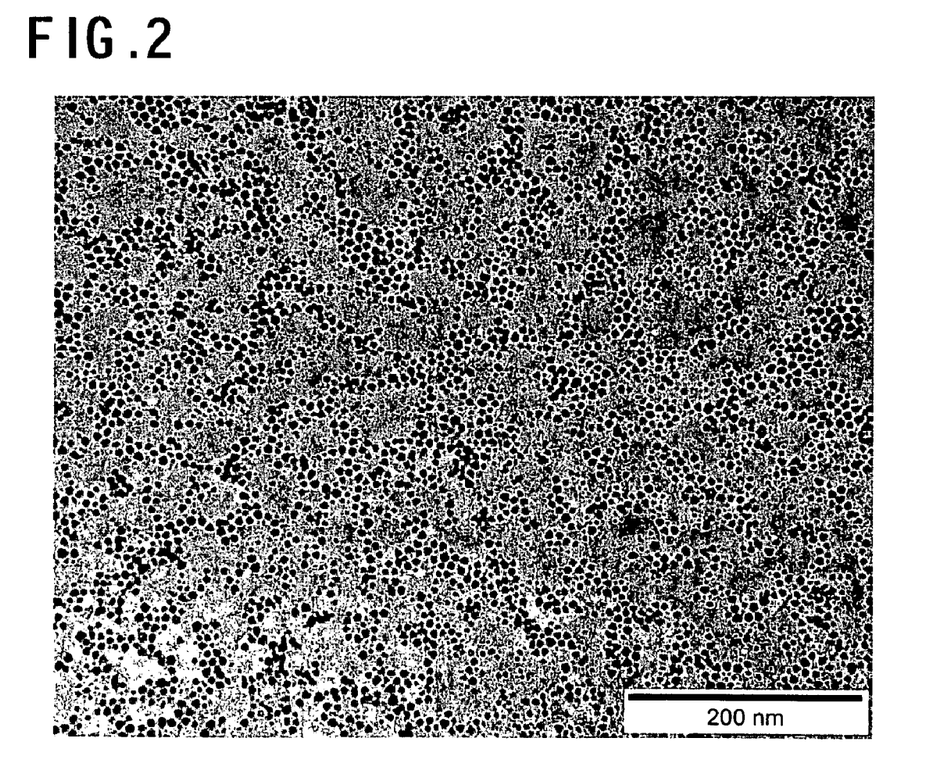
FIG. 2 is a TEM photomicrograph of the group of Co magnetic nanoparticles in Example 1.

A dispersion solution obtained by redispersing the group of nanoparticles in a hexane solvent was placed on a TEM grid and quickly dried to prepare a thin film of the group of Co magnetic nanoparticles, and a TEM photomicrograph of the thin film is shown in FIG. 2.

The group of Co magnetic nanoparticles had an average particle diameter of 8.0 nm and a particle diameter variance of 20%. The results of the analysis of composition have confirmed that a Co shell having a thickness of 3.0 nm and a Pt content of 4.5 at. % is formed to surround a Pt atom cluster core having a diameter of 2.0 nm in the individual metal magnetic nanoparticles.

Figure 3:
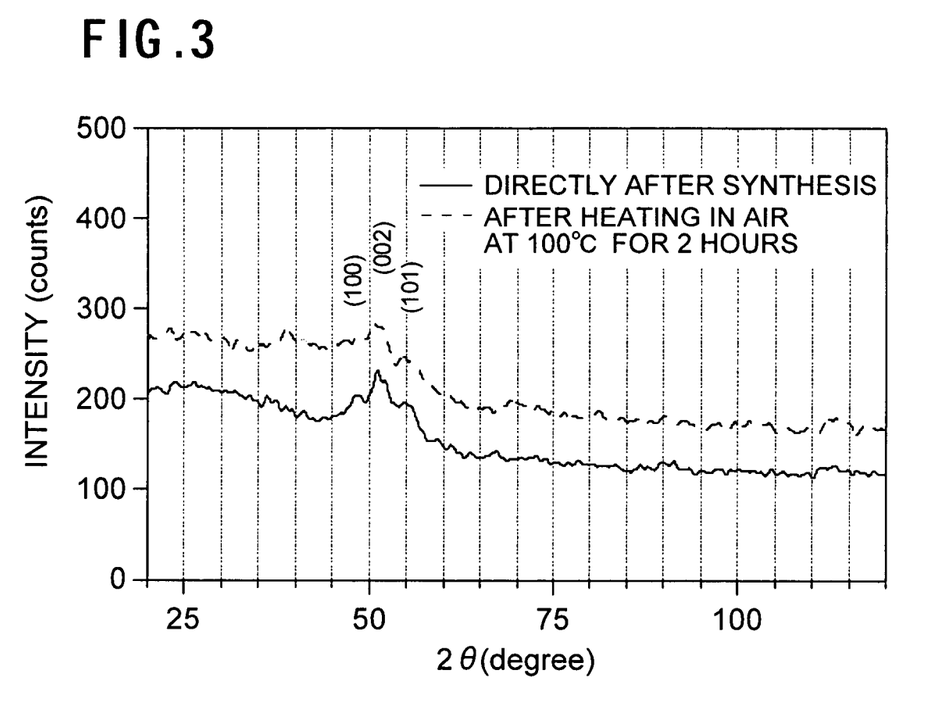
FIG. 3 is powder XRD spectra (Co Kα line) of the group of Co magnetic nanoparticles in Example 1, measured before and after the heating.

A powder X-ray diffraction (XRD) spectrum (Co Kα line) of the group of Co magnetic nanoparticles obtained is shown in FIG. 3 (solid line). From the results of the analysis, it has been found that the Co shell has an hcp structure. In addition, with respect to the group of Co magnetic nanoparticles, magnetic properties were evaluated at room temperature, and the results of the evaluation indicate that the group of Co magnetic nanoparticles had a saturation magnetization of 110 emu/g and exhibited superparamagnetism.

Further, the group of Co magnetic nanoparticles was heated in air at 100° C. for 2 hours, but it kept the hcp structure {FIG. 3 (dotted line)}, which indicates that the group of Co magnetic nanoparticles has excellent oxidation resistance.

In the present Example, a group of magnetic nanoparticles was produced using Pt (II) acetylacetonato complex as the noble metal precursor and Co (II) acetato complex tetrahydrate as the precursor of a metal other than the noble metal. When using Pt (II) acetylacetonato complex as the noble metal precursor and Fe (II) acetato complex and Co (II) acetato complex tetrahydrate as the precursor of a metal other than the noble metal, a group of magnetic nanoparticles of the present invention having an FeCo shell structure containing Pt was obtained.

When using Pt (II) acetylacetonato complex as the noble metal precursor and Fe (II) acetato complex and Ni (II) acetato complex tetrahydrate as the precursor of a metal other than the noble metal, a group of magnetic nanoparticles of the present invention having an FeNi shell structure containing Pt was obtained.

EXAMPLE 2

Addition of Noble Metal Precursor to Heated Solution

Using Pt (II) acetylacetonato complex as the noble metal precursor, Co (II) acetato complex tetrahydrate as the non-noble metal precursor, a combination of oleic acid and oleylamine as the dispersion stabilizer, 1,2-hexadecanediol as the reducing agent, and phenyl ether as the organic solvent, a reaction was conducted in an argon gas atmosphere.

First, a phenyl ether solution containing 4 mmol of Co (II) acetato complex tetrahydrate, 2 mmol of oleic acid, and 2 mmol of oleylamine was heated to 250° C., and then a phenyl ether solution containing 0.21 mmol of Pt (II) acetylacetonato complex and 8.42 mmol of 1,2-hexadecanediol was added to the heated solution. Phenyl ether was used in an amount of 50 ml. The Pt (II) ion ratio was 5.

Then, the phenyl ether solution prepared was reacted at a reaction temperature of 250° C. for 30 minutes to synthesize a group of Co magnetic nanoparticles. Subsequently, settlings were separated and removed, and then, using ethanol as a flocculant and toluene as a hydrocarbon solvent, the group of Co magnetic nanoparticles was purified and redispersed.

As a result, it was found that the yield was as high as 79%.

Figure 4A:
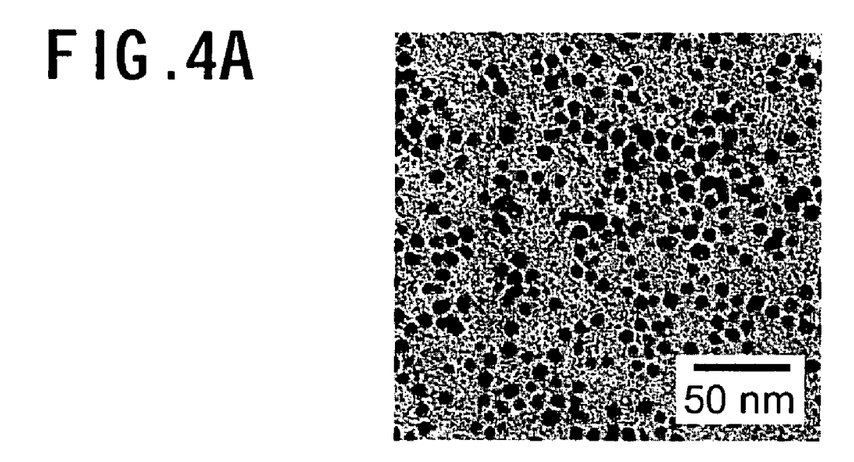
FIGS. 4A to 4C are TEM photomicrographs of the groups of Co magnetic nanoparticles in Examples 2 to 4.

A dispersion solution obtained by redispersing the group of nanoparticles in a hexane solvent was placed on a TEM grid and quickly dried to prepare a thin film of the group of Co magnetic nanoparticles, and a TEM photomicrograph of the thin film is shown in FIG. 4A.

The group of Co magnetic nanoparticles had an average particle diameter of 6.9 nm and a particle diameter variance of 25%. The results of the analysis of composition have confirmed that a Co shell having a thickness of 2.5 nm and a Pt content of 5.5 at. % is formed to surround a Pt atom cluster core having a diameter of 2.0 nm in the individual Co magnetic nanoparticles.

The Co shell has an hcp structure, and the results of the evaluation of magnetic properties at room temperature indicate that the group of Co magnetic nanoparticles had a saturation magnetization of 105 emu/g and exhibited superparamagnetism. A heating test was conducted under the same conditions as those in Example 1, and, as a result, the group of Co magnetic nanoparticles exhibited excellent oxidation resistance similar to that in Example 1.

EXAMPLE 3

Control of Particle Diameter by Selecting the Type of the Dispersion Stabilizer

A group of Co magnetic nanoparticles was synthesized under substantially the same conditions as those in Example 2 except that a combination of 2 mmol of oleic acid and 2 mmol of trioctylphosphinic acid was used as the dispersion stabilizer.

As a result, it was found that the yield was as high as 91%.

Figure 4B:
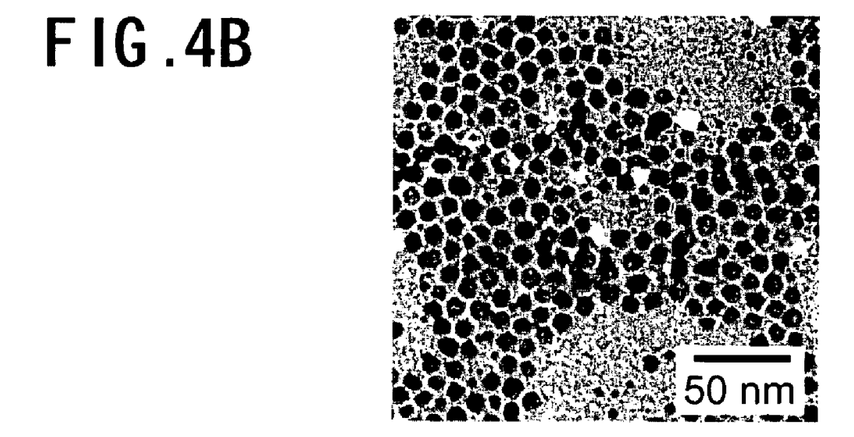

A TEM photomicrograph of a thin film of the group of Co magnetic nanoparticles prepared in the same manner as in Example 2 is shown in FIG. 4B.

The group of Co magnetic nanoparticles had an average particle diameter of 9.2 nm and a particle diameter variance of 21%. The results of the analysis of composition have confirmed that a Co shell having a thickness of 3.5 nm and a Pt content of 4.5 at. % is formed to surround a Pt atom cluster core having a diameter of 2.0 nm in the individual Co magnetic nanoparticles.

The Co shell has an hcp structure, and the results of the evaluation of magnetic properties at room temperature indicate that the group of Co magnetic nanoparticles had a saturation magnetization of 110 emu/g and exhibited superparamagnetism. A heating test was conducted under the same conditions as those in Example 1, and, as a result, the group of Co magnetic nanoparticles exhibited excellent oxidation resistance similar to that in Example 1.

EXAMPLE 4

Control of Particle Diameter by Selecting the Amount of the Noble Metal Precursor A group of Co magnetic nanoparticles was synthesized under substantially the same conditions as those in Example 2 except that 4 mmol of oleic acid was used as the dispersion stabilizer, and that the amounts of the components were adjusted so that the Pt (II) ion ratio became 1% {Pt (II) acetylacetonato complex: 0.05 mmol; Co (II) acetato complex tetrahydrate: 4 mmol; 1,2-hexadecanediol: 8.08 mmol}.

As a result, it was found that the yield was as high as 70%.

Figure 4C:
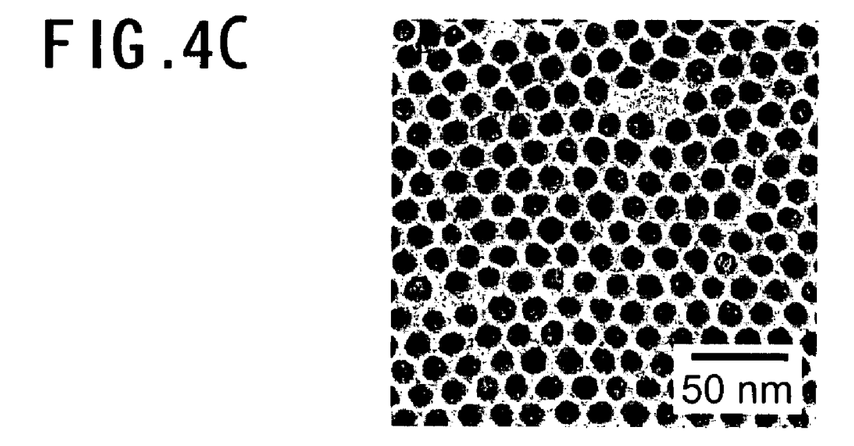

A TEM photomicrograph of a thin film of the group of Co magnetic nanoparticles prepared in the same manner as in Example 2 is shown in FIG. 4C.

The group of Co magnetic nanoparticles had an average particle diameter of 13 nm and a particle diameter variance of 13%. The results of the analysis of composition have confirmed that a Co shell having a thickness of 5.5 nm and a Pt content of 1.0 at. % is formed to surround a Pt atom cluster core having a diameter of 2.0 nm in the individual Co magnetic nanoparticles.

The Co shell has an hcp structure, and the results of the evaluation of magnetic properties at room temperature indicate that the group of Co magnetic nanoparticles had a saturation magnetization of 115 emu/g and a coercive force of 25 kA/m. A heating test was conducted under the same conditions as those in Example 1, and, as a result, the group of Co magnetic nanoparticles exhibited excellent oxidation resistance similar to that in Example 1.

COMPARATIVE EXAMPLE 1

A group of Co magnetic nanoparticles was obtained under substantially the same conditions as those in Example 1 except that the ratio of the Pt (II) ions to the whole metal ions in the phenyl ether solution was changed to 0.50%.

As a result, it was found that the yield was as low as 17%.

COMPARATIVE EXAMPLE 2

A group of Co magnetic nanoparticles was obtained under substantially the same conditions as those in Example 1 except that the noble metal precursor {Pt (II) acetylacetonato complex} was not used.

As a result, it was found that the yield was as low as 5%.

COMPARATIVE EXAMPLE 3

Figure 5:
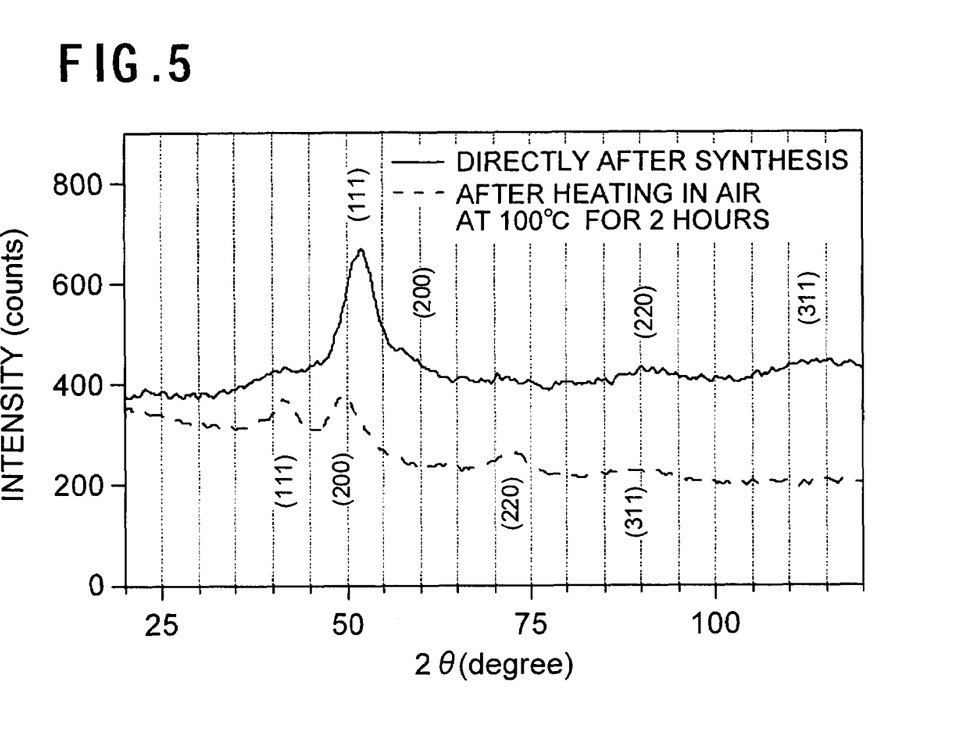
FIG. 5 is powder XRD spectra (Co Kα line) of the group of Co magnetic nanoparticles in Comparative Example 3, measured before and after the heating.

Using a group of fcc-Co magnetic nanoparticles having an average particle diameter of 8.9 nm and a particle diameter variance of 13%, which was synthesized using no noble metal precursor, heating was conducted in air at 100° C. for 2 hours. Powder XRD spectra (Co Kα line) measured before and after the heating are shown in FIG. 5 (solid line: before the heating; dotted line: after the heating). The results of the analysis have confirmed that the group of fcc-Co magnetic nanoparticles was oxidized into CoO after the heating and hence it was poor in oxidation resistance.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A group of metal based nanoparticles, said metal based nanoparticle comprising:
   a core including a noble metal cluster having a diameter of 3 nm or less; and
   a metal shell including a metal component, the metal shell being formed to surround said core, and having noble metal atoms randomly distributed therein;
   wherein said metal shell has a noble metal atom content that ranges from about 4.5 at. % to about 15 at. %, wherein said noble metal is selected from the group consisting of Pt, Rh, Au, Pd, Ru, Ag, Ir, Os, and combinations thereof, and wherein said metal component is selected from the group consisting Fe, Co, and Ni, combinations thereof, a binary alloy thereof, and a ternary alloy thereof.

2. The group of metal based nanoparticles of claim 1, wherein the metal shell has a noble metal atom content ranges from about 4.5% to about 5.5%.

* * * * *